United States Patent
Kim et al.

(10) Patent No.: US 10,018,761 B2
(45) Date of Patent: Jul. 10, 2018

(54) COMPENSATION FILM AND METHOD OF MANUFACTURING THE SAME

(71) Applicant: SAMSUNG ELECTRONICS CO., LTD., Suwon-si, Gyeonggi-do (KR)

(72) Inventors: Ju Hyun Kim, Anyang-si (KR); Seunghyun Lee, Yongin-si (KR); Hyunseok Choi, Anyang-si (KR); Beom Seok Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 113 days.

(21) Appl. No.: 15/147,346

(22) Filed: May 5, 2016

(65) Prior Publication Data
US 2017/0184769 A1    Jun. 29, 2017

(30) Foreign Application Priority Data

Dec. 23, 2015    (KR) .................. 10-2015-0185265

(51) Int. Cl.
G02B 5/30    (2006.01)
G02B 1/12    (2006.01)
G02B 1/04    (2006.01)

(52) U.S. Cl.
CPC ............. G02B 5/3083 (2013.01); G02B 1/04 (2013.01); G02B 1/12 (2013.01); G02B 5/3016 (2013.01)

(58) Field of Classification Search
CPC ....... G02B 5/3016; G02B 5/3083; G02B 1/12
See application file for complete search history.

(56) References Cited

U.S. PATENT DOCUMENTS

| | | | | |
|---|---|---|---|---|
| 2006/0219598 A1* | 10/2006 | Cody | ...................... | B05D 7/16 208/255 |
| 2008/0309860 A1 | 12/2008 | Nimura et al. | | |
| 2009/0178756 A1* | 7/2009 | Matsuoka | ............ | G02B 5/3083 156/99 |
| 2010/0026940 A1 | 2/2010 | Takegami et al. | | |
| 2011/0236676 A1* | 9/2011 | Kimura | ............... | B29C 47/0021 428/336 |
| 2012/0050652 A1* | 3/2012 | Chang | ................... | B29C 43/003 349/96 |
| 2013/0044286 A1* | 2/2013 | Yoon | .................... | G02F 1/13363 349/194 |
| 2013/0303677 A1* | 11/2013 | Kim | ..................... | G02B 5/3016 524/508 |
| 2014/0124714 A1* | 5/2014 | Lee | ...................... | G02B 5/3033 252/585 |
| 2014/0126053 A1* | 5/2014 | Won | .................. | G02F 1/133533 359/487.02 |
| 2014/0211311 A1 | 7/2014 | Harris et al. | | |

(Continued)

FOREIGN PATENT DOCUMENTS

| | | |
|---|---|---|
| JP | 3808913 | 5/2006 |
| JP | 2011118421 | 6/2011 |

(Continued)

*Primary Examiner* — Jia Pan
(74) *Attorney, Agent, or Firm* — Cantor Colburn LLP

(57) ABSTRACT

A compensation film includes an elongation film having an elongation rate of greater than or equal to about 200% in a uniaxial direction and having a surface energy of about 40 mJ/m² to about 65 mJ/m² and a liquid crystal layer disposed on one side of the elongation film and including liquid crystals.

16 Claims, 6 Drawing Sheets

(56) References Cited

U.S. PATENT DOCUMENTS

2014/0225288 A1    8/2014   Haida et al.
2015/0070638 A1    3/2015   Lee et al.
2015/0131032 A1    5/2015   Kim et al.

FOREIGN PATENT DOCUMENTS

| | | |
|---|---|---|
| JP | 201325191 | 2/2013 |
| JP | 201368500 | 4/2013 |
| JP | 2014186355 | 10/2014 |
| KR | 1020150030108 | 3/2015 |

\* cited by examiner

COMPENSATION FILM AND METHOD OF MANUFACTURING THE SAME

CROSS REFERENCE TO RELATED APPLICATION

This application claims priority to and the benefit of Korean Patent Application No. 10-2015-0185265 filed in the Korean Intellectual Property Office on Dec. 23, 2015, and all the benefits accruing therefrom under 35 U.S.C. § 119, the content of which in its entirety is herein incorporated by reference.

BACKGROUND

1. Field

A compensation film and a method of manufacturing the same are disclosed.

2. Description of the Related Art

Commonly used flat panel displays may be classified into a light-emitting display device emitting light by itself and a non-emissive display device requiring a separate light source. An optical film such as a compensation film is frequently employed for improving the image quality the display device.

In the case of the light emitting display device, for example, an organic light emitting display, the visibility and the contrast ratio may be deteriorated by the reflection of exterior light from a metal such as an electrode. As a solution for solving the external light reflection, the liquid crystal display (LCD), which is a non-emissive display device, changes the linear polarized light into circularly polarized light to improve the image quality according to the type of device e.g., transparent, transflective, reflective, and so on. Nonetheless, improved light-emitting devices in which reflection of exterior light has been minimized are needed.

SUMMARY

In order to minimize reflection of external light by the organic light emitting display and leakage thereof to the outside, linear polarized light is shifted into circularly polarized light using a polarizer and a compensation film. However, currently-developed compensation films are thick and hinder the manufacture of a thin display device. In addition, the optical film may hardly be applied to a flexible display device due to thickness and optical durability.

In order to decrease a thickness of a compensation film, a compensation film including a liquid crystal layer has been researched. However, an alignment layer is needed so as to align liquid crystals of a liquid crystal layer in a predetermined direction. In this case, processes such as coating, drying, and alignment, of an alignment layer may be added. However, the alignment layer may have unintentional effects on the quality of a compensation film.

One embodiment provides a thin compensation film without the need for an alignment layer and which is applicable to a flexible display device.

Another embodiment provides a method of manufacturing the compensation film.

Yet another embodiment provides an optical film including the compensation film.

Still another embodiment provides a display device including the compensation film or the optical film.

According to one embodiment, a compensation film includes an elongation film having an elongation rate of greater than or equal to about 200% in a uniaxial direction and a surface energy of about 40 millijoule per square meter ($mJ/m^2$) to about 65 $mJ/m^2$ and a liquid crystal layer disposed on one side of the elongation film and including liquid crystals.

The elongation film may include at least one of polyolefin, polycarbonate, polyethylene terephthalate, or polyvinyl alcohol.

The elongation film may have an elongation rate of about 200% to about 1000% in a uniaxial direction.

The liquid crystals may be aligned along a uniaxial direction of the elongation film.

The elongation film and the liquid crystal layer may be in direct contact with each other.

The elongation film has an in-plane phase delay of less than or equal to about 750 nm at a 550 nm wavelength.

The elongation film has an in-plane phase delay of about 110 nm to about 300 nm at a 550 nm wavelength.

According to another embodiment, a method of manufacturing a compensation film includes preparing an elongation film having an elongation rate of greater than or equal to about 200% in a uniaxial direction and having surface energy of about 40 $mJ/m^2$ to about 65 $mJ/m^2$ and forming a liquid crystal layer on one side of the elongation film.

The preparing of the elongation film may include elongating a film to an elongation rate of about 200% to about 1000% in a uniaxial direction.

The preparing of the elongation film may further includes subjecting the film to at least one of a corona treatment, an ultraviolet (UV) treatment, a plasma treatment, or a halogenation treatment.

The forming of the liquid crystal layer may include coating a solution including liquid crystals on one side of the elongation film, drying the coated solution, and curing the liquid crystals.

According to another embodiment, a method of manufacturing an optical film includes preparing a compensation film by preparing an elongation film having an elongation rate of greater than or equal to about 200% in a uniaxial direction and a surface energy of about 40 $mJ/m^2$ to about 65 $mJ/m^2$ and forming a liquid crystal layer on the elongation film, preparing a polarizer, and disposing the polarizer to face a liquid crystal layer of the compensation film, and transferring the liquid crystal layer to the polarizer from the compensation film.

The method may further include applying an adhesive on one side of the polarizer, and adhering the polarizer and the liquid crystal layer by interposing the adhesive.

The preparing the elongation film may include elongating a film to an elongation rate of about 200% to about 1000% in a uniaxial direction and subjecting the film to at least one of a corona treatment, an ultraviolet (UV) treatment, a plasma treatment, or a halogenation treatment.

The forming of the liquid crystal layer may include coating a solution including liquid crystals on one side of the elongation film, drying the coated solution, and curing the liquid crystals.

A difference between in-plane phase delay at a 550 nm wavelength of the liquid crystal layer and in-plane phase delay at a 550 nm wavelength of the transferred liquid crystal layer may be less than or equal to about 5 nanometers (nm).

The preparing of the polarizer may include melt-blending a hydrophobic polymer resin and a dichroic dye and preparing a polarizing film in a form of a sheet using the melt-blend.

According to another embodiment, a display device including the compensation film is provided.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
FIG. 1 is a schematic cross-sectional view showing a compensation film according to one embodiment.

Exemplary embodiments will hereinafter be described in detail, and may be easily performed by those who have common knowledge in the related art. However, this disclosure may be embodied in many different forms and is not construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that when an element is referred to as being "above" or "on" another element, it can be directly above or on the other element, or intervening elements may be present therebetween. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a compensation film according to one embodiment is described with reference to the drawings.

FIG. 1 is a schematic cross-sectional view showing a compensation film according to one embodiment.

Referring to FIG. 1, a compensation film 100 includes an elongation film 110 and a liquid crystal layer 120.

The elongation film 110 may be a substrate of the compensation film 100.

The elongation film 110 may be a polymer film elongated in a uniaxial direction, and may include, for example, at least one of polyolefin, polycarbonate, polyethylene terephthalate, or polyvinyl alcohol, but is not limited thereto. The polyolefin may be, for example, polyethylene, polypropylene, a copolymer thereof, or a combination thereof.

The elongation film 110 may be prepared by melt-extruding the above polymer into a sheet and elongating the sheet at a predetermined rate. The melt-extruding may be performed at a temperature greater than or equal to the melting point of the polymer, for example, at a temperature of about 180° C. to about 350° C. The elongation may be performed in a main chain direction of the polymer.

The elongating may be performed in a uniaxial direction at a temperature greater than or equal to the glass transition (Tg) temperature of the polymer, and may be, for example performed at a glass transition temperature of the polymer ±50° C., for example at a temperature of about 50° C. to about 200° C.

Due to the elongation, the elongation film 110 may have directivity along with the main chain direction of the polymer and the alignment of liquid crystals of the liquid crystal layer 120 may thus be regulated without a separate alignment layer. Accordingly, the compensation film 100 may have a structure in which the elongation film 110 is in contact with the liquid crystal layer 120 without disposing a separate alignment layer beneath the liquid crystal layer 120.

The elongating may be performed at an elongation rate of greater than or equal to about 200%, for example about 200% to about 1000%. The "elongation rate" or "elongation percentage" refers to a ratio of the length of the film after the elongation to the length of the film prior to the elongation of the film, and means the elongation extent of the film after uniaxial elongation. The elongation rate falling within the above range may appropriately regulate alignment of the liquid crystals of the liquid crystal layer 120 and simultaneously prevent phase delay of the elongation film 110 from being excessively increased.

The elongation film 110 may have a relatively thin thickness of less than or equal to about 50 micrometers (μm), for example about 5 μm to about 50 μm, or about 5 μm to about 30 μm.

The liquid crystals may be directly coated on one side of the elongation film 110 in order to obtain the structure in which the elongation film 110 is in direct contact with the liquid crystal layer 120. The liquid crystals may be, for example, provided as a liquid crystal solution. Herein, good coating of the liquid crystal solution may be achieved by controlling the surface energy of the elongation film 110, and for example, the elongation film 110 may have surface energy from about 40 mJ/m² to about 65 mJ/m². The elongation film 110 having a surface energy within the above range may prevent peeling of the liquid crystal layer 120 from the elongation film 110 during transfer of the liquid crystal layer 120 as well as prevent dewetting of the liquid crystal solution on the surface of the elongation film 110. In other words, the coating and peeling properties of the liquid crystal layer 120 coated on the elongation film 100 may be simultaneously satisfactory. The surface energy of the elongation film 110 may be obtained by surface-treating the elongation film 110. For example, the surface energy of the elongation film 110 may be obtained by at subjecting the elongation film 110 to at least one of a corona treatment, ultraviolet (UV) treatment, plasma, or a halogenations treatment.

The elongation film 110 may have predetermined phase delay.

The phase delay of the elongation film 110 may be measured as in-plane phase delay ($R_{o1}$) and thickness direction phase delay ($R_{th1}$). The in-plane phase delay ($R_{o1}$) of the elongation film 110 occurs in an in-plane direction and may be expressed as, $R_{o1}=(n_{x1}-n_{y1})d_1$. The thickness direction phase delay ($R_{th1}$) of the elongation film 110 occurs in a thickness direction and may be expressed as $R_{th1}=\{[(n_{x1}+n_{y1})/2]-n_{z1}\}d_1$. Herein, $n_{x1}$ is a refractive index at a direction where in-plane refractive index of the elongation film 110 is largest (hereinafter, 'slow axis'), $n_{y1}$ is a refractive index at a direction where in-plane refractive index of the elongation film 110 is smallest (hereinafter, 'fast axis'), $n_{z1}$ is a refractive index in a direction perpendicular to the slow axis and the fast axis of the elongation film 110, and $d_1$ is a thickness of the elongation film 110.

The elongation film 110 may be controlled to have in-plane phase delay and thickness direction phase delay within predetermined ranges by changing $n_{x1}$, $n_{y1}$, $n_{z1}$ and/or the thickness ($d_1$).

For example, the elongation film 110 may have an in-plane phase delay of less than or equal to about 750 nm, for example about 5 nm to about 720 nm, at a 550 nm wavelength (hereinafter, 'reference wavelength').

The liquid crystal layer 120 is disposed on one side of the elongation film 110 and includes liquid crystals.

The liquid crystals may include a monomer, an oligomer, and/or a polymer and may have a shape such as a rigid rod stretched out in one direction or a wide disk. The liquid crystals may, for example, have a positive or negative birefringence. The liquid crystals may be aligned in one direction by an alignment control force applied from the elongation film 110 along an elongation direction of the elongation film 110.

The liquid crystals may be include a reactive mesogen liquid crystal and may have, for example, at least one polymerizable functional group. The reactive mesogen liquid crystal may include at least one of a rod-shaped aromatic derivative having at least one polymerizable functional group, propylene glycol 1-methyl, propylene glycol 2-acetate, or a compound represented by $P^1$-$A^1$-$(Z^1$-$A^2)_n$-$P^2$ (wherein $P^1$ and $P^2$ are a polymerizable functional group and are independently acrylate, methacrylate, vinyl, vinyloxy, or epoxy, $A^1$ and $A^2$ are independently 1,4-phenylene or naphthalene-2,6-diyl group, $Z^1$ is a single bond, —O—, —S—, —C(=O)—, —C(=O)O—, —O(C=O)—, or —O(C=O)O—, and n is 0, 1 or 2), but is not limited thereto.

The reactive mesogen liquid crystal may include, for example, a compound represented by Chemical Formula A.

$$(P^1—S^1—X^1)_{n1}\text{-MG-}(X^2—S^2—P^2)_{n2} \quad \text{[Chemical Formula A]}$$

In Chemical Formula A,

MG is a rod-shaped mesogenic group, $X^1$ and $X^2$ are independently a single bond, —O—, —S—, —C(=O)—, —C(=O)O—, —(O=C)O—, —O(C=O)O—, or one of (a) to (k) below:

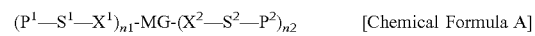

(a)

(b)

(c)

(d)

(e)

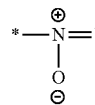

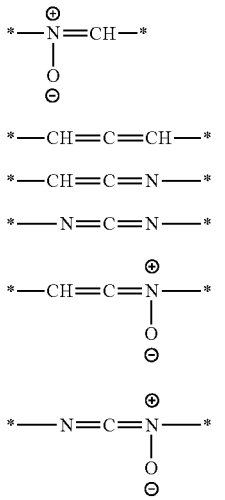

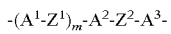

S¹ and S² are independently a single bond or a substituted or unsubstituted C1 to C30 spacer group, P¹ and P² are independently a polymerizable functional group, and $n^1$ and $n^2$ are independently 0 or 1, provided that $n^1$ and $n^2$ are not simultaneously 0.

For example, MG may be at least one of a substituted or unsubstituted aryl group, a substituted or unsubstituted heteroaryl group, a substituted or unsubstituted cycloalkyl group, a substituted or unsubstituted heterocycloalkyl group, an acetylene group (*—C≡C*), allylene group (*—C=C=C—*), or a combination thereof.

For example, MG of Chemical Formula A may be represented by Chemical Formula B, but is not limited thereto.

-(A¹-Z¹)$_m$-A²-Z²-A³-    [Chemical Formula B]

In Chemical Formula B,

A¹, A², and A³ are independently a substituted or unsubstituted 1,4-phenylene group, a substituted or unsubstituted 1,4-cyclohexylene group, a substituted or unsubstituted 1,4-cyclohexenylene group, or a substituted or unsubstituted naphthalene-2,6-diyl, Z¹ and Z² are independently a single bond, —O—, —S—, —C(=O)—, —C(=O)O—, —(O=C)O—, —O(C=O)O—, —(CH$_2$)$_{p1}$—, —O(CH$_2$)$_{p2}$—, —(CH$_2$)$_{p3}$O—, —CH=CH—, —C≡C—, —CH=CH—C(=O)O—, or —(O=C)O—CH=CH—, wherein p1, p2 and p3 are each independently 1 to 12, and m is 0, 1 or 2.

For example, S¹ and S² of Chemical Formula A may independently be a single bond or a substituted or unsubstituted C1 to C20 alkylene group, but is not limited thereto.

For example, P¹ and P² of Chemical Formula A may each independently be CH$_2$=CH—C(=O)O—, CH$_2$=CCH$_3$—C(=O)O—, CH$_2$=CCl—C(=O)O—, CH$_2$=CH—O—, C(CH$_3$)H=CH—O—, CHCl=CH—O—, CH$_2$=CH-Ph-, or CH$_2$=CH-Ph-O— (where Ph is a substituted or unsubstituted phenyl group), but is not limited thereto.

The reactive mesogenic liquid crystal may perform polymerization reactions of functional groups upon exposure to heat or light, and the light may be, for example, ultraviolet (UV) light having a wavelength from about 250 nm to about 400 nm.

The liquid crystals may be a single type of liquid crystal or two or more types of liquid crystals.

The liquid crystal layer 120 may be a phase delay layer.

The phase delay of the liquid crystal layer 120 may be measured as in-plane phase delay ($R_{o2}$) and thickness direction phase delay ($R_{th2}$). The in-plane phase delay ($R_{o2}$) of the liquid crystal layer 120 occurs in an in-plane direction and may be expressed as, $R_{o2}=(n_{x2}-n_{y2})d_2$. The thickness direction phase delay ($R_{th2}$) of the liquid crystal layer 120 occurs in a thickness direction and may be expressed as $R_{th2}=\{[(n_{x2}+n_{y2})/2]-n_{z2}\}d_2$. Herein $n_{x2}$ is a refractive index at a direction where the in-plane refractive index of the liquid crystal layer 120 is largest (hereinafter, 'slow axis'), $n_{y2}$ is a refractive index at a direction where the in-plane refractive index of the liquid crystal layer 120 is smallest (hereinafter, 'fast axis'), $n_{z1}$ is a refractive index in a direction perpendicular to the slow axis and the fast axis of the liquid crystal layer 120, and $d_2$ is a thickness of the liquid crystal layer 120.

The liquid crystal layer 120 may be controlled to have phase delay within a predetermined range by changing refractive indices and/or thicknesses at a slow axis and/or a fast axis. For example, in-plane phase delay ($R_{o2}$) of the liquid crystal layer 120 may be about 110 nm to about 300 nm at a reference wavelength.

The liquid crystal layer 120 may be, for example a λ/4 plate or λ/2 plate.

The liquid crystal layer 120 may be an anisotropic liquid crystal layer, and may have a positive or negative birefringence.

The liquid crystal layer 120 may have, for example, a refractive index satisfying one of Relationship Equations 1 to 3.

$n_{x2}>n_{y2}=n_{z2}$    [Relationship Equation 1]

$n_{x2}<n_{y2}=n_{z2}$    [Relationship Equation 2]

$n_{x2}>n_{z2}>n_{y2}$    [Relationship Equation 3]

In Relationship Equations 1 to 3, $n_{x2}$ is a refractive index of the liquid crystal layer 120 at a slow axis, $n_{y2}$ is a refractive index of the liquid crystal layer 120 at a fast axis, and $n_z$ is a refractive index of the liquid crystal layer 120 in a direction perpendicular to $n_x$ and $n_y$.

The liquid crystal layer 120 may have a thickness of less than or equal to about 10 μm, about 1 μm to about 10 μm, or about 1 μm to about 5 μm.

The in-plane phase delay of the optical film 100, that is, the sum of the in-plane phase delay of the liquid crystal layer 120 and the in-plane phase delay of the elongation film 110 may be less than or equal to about 1000 nm. Accordingly, reliability of the compensation film 100 may be secured by evaluating the optical properties of the compensation film 100 in real time.

The compensation film according to one embodiment uses an elongation film as a substrate and is capable of independently providing an alignment regulation force and thus a liquid crystal layer may be formed on the substrate without requiring a separate alignment layer. Accordingly, the omission of the alignment layer may simplify the manufacturing process and reduce costs. In addition, since the alignment layer is not used, it is prevented from having a negative influence on the quality of the compensation film, and the compensation film may achieve satisfactory quality.

Hereinafter, a method of manufacturing the compensation film is described.

A method of manufacturing a compensation film according to one embodiment includes preparing an elongation film 110 and forming a liquid crystal layer 120 on one side of the elongation film 110.

The elongation film 110 may be prepared by melt-extruding the polymer, preparing a polymer film from the melt-extrusion product, elongating the polymer film in a uniaxial direction, and surface-treating the elongated polymer film.

The polymer may include, for example, at least one of polyolefin, polycarbonate, polyethylene terephthalate, or polyvinyl alcohol, but is not limited thereto. The melt-extruding may be performed at a temperature of greater than or equal to the melting point of the polymer, for example, at a temperature of about 180° C. to about 350° C.

The polymer film may be, for example, prepared by injecting the melt-extrusion product into a mold and compressing with under high pressure, or by discharging the molten mixture in a chill roll through a T-die.

The elongating may be performed in a uniaxial direction at temperature greater than or equal to the glass transition temperature of the polymer, and may be, for example performed at a glass transition temperature of the polymer ±50° C., for example at a temperature of about 50° C. to about 200° C. The elongating may be performed at an elongation rate of greater than or equal to about 200%, for example about 200% to about 1000%. The elongation rate within the above range may provide appropriate alignment control force to the liquid crystals of the liquid crystal layer 120 and simultaneously prevent phase delay of the elongation film 110 from being excessively increased.

The surface treatment provides the elongation film 110 with affinity for the post-described liquid crystal solution. The surface may include, for example, at least one of a corona treatment, an ultraviolet (UV) treatment, a plasma treatment, or a halogenation treatment. Herein, through the surface treatment, the elongation film 110 may have surface energy from about 40 mJ/m$^2$ to about 65 mJ/m$^2$. An elongation film 110 having a surface energy within the above range may prevent dewetting of the liquid crystal solution on the surface of the elongation film 110 and may prevent peeling the liquid crystal layer 120 from the elongation film 110 during transfer of the liquid crystal layer 120. In other words, the coating and peeling properties of the liquid crystal layer 120 on the elongation film 100 may be simultaneously satisfactory.

The liquid crystal layer 120 may be formed, for example, by coating a liquid crystal solution including liquid crystals on the elongation film 110, drying the liquid crystal solution, and curing the liquid crystals.

The liquid crystal solution may include liquid crystals, an initiator, and a solvent.

The liquid crystals are the same as described above.

The liquid crystals may be included in an amount of about 5 wt % to about 50 wt %, for example about 5 wt % to about 40 wt %, or about 10 wt % to about 30 wt %, based on the total amount of the liquid crystal solution.

The initiator may be a photoinitiator or a thermal initiator.

The photoinitiator may be, for example, at least one of benzoin and a derivative thereof such as benzoin ethyl ether, benzoin isobutyl ether, or benzoin methyl ether; benzyl ketal; acetophenone and a derivative thereof such as 2,2-diethoxyacetophenone, 2,2-dimethoxy-2-phenylacetophenone, 4'-ethoxyacetophenone, 3'-hydroxyacetophenone, and 4'-hydroxyacetophenone; benzophenone and a derivative thereof such as 3-hydroxybenzophenone, 4-hydroxybenzophenone, and 4'-phenoxyacetophenone; or acylphosphine oxide such as diphenyl (2,4,6-trimethylbenzoyl)phosphine oxide, but is not limited thereto.

The thermal initiator may be for example, at least one of an azo compound such as 4,4-azobis (4-cyanovaleric acid), 1,1'-azobis(cyclohexane carbonitrile) (1,1'-azobis(cyclohexane carbonitrile)) or 2,2'-azobisisobutyronitrile (AIBN); an inorganic peroxide such as ammonium persulfate; hydroxymethane sulfinic acid monosodium salt dehydrate; sodium or potassium persulfate; or an organic peroxide such as benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, and peracetic acid, but is not limited thereto.

The initiator may be included in an amount of about 0.01 wt % to about 5 wt % based on the total amount of the liquid crystal solution. Within this ranges, it may be included in an amount of about 0.1 wt % to about 4 wt %, or about 0.1 wt % to about 2 wt %.

The liquid crystal solution may further include an additive. The additive may be at least one of a surfactant, a dissolution auxiliary agent, or a dispersing agent, but is not limited thereto.

The solvent may dissolve and/or disperse the above components, and may not be particularly limited as long as it does not cause physical or chemical damage to the elongation film 110. The solvent may be, for example, at least one selected from deionized water, methanol, ethanol, propanol, isopropanol, 2-methoxyethanol, 2-ethoxyethanol, 2-propoxyethanol, 2-butoxyethanol, methylcellosolve, ethylcellosolve, butylcellosolve, diethylene glycol methylether, diethylene glycol ethyl ether, dipropylene glycol methyl ether, toluene, xylene, hexane, heptane, octane, ethylacetate, butylacetate, diethylene glycol dimethyl ether, diethylene glycol dimethylethyl ether, methyl ethoxy propionate, ethyl ethoxy propionate, ethyl lactate, propylene glycol methyl ether acetate, propylene glycol methyl ether, propylene glycol propyl ether, methyl cellosolve acetate, ethyl cellosolve acetate, diethylene glycol methylacetate, diethylene glycol ethyl acetate, acetone, methyl ethyl ketone, methyl isobutyl ketone, cyclopentanone, cyclohexanone, dimethyl formamide (DMF), N,N-dimethyl acetamide (DMAc), N-methyl-2-pyrrolidone, γ-butyrolactone, diethylether, ethylene glycol dimethyl ether, diglyme, tetrahydrofuran, acetylacetone, acetonitrile, chloroform, dichloromethane, tetrachloroethane, trichloroethylene, tetrachloroethylene, chlorobenzene, benzene, toluene, or xylene. The solvent may be a single solvent or a mixed solvent.

The solvent may be included in a balance amount in the liquid crystal solution when combined with the above components.

The liquid crystal layer may be provided by directly coating the liquid crystal solution on the elongation film 110 using, for example, a method such as spin coating, slit coating, dip coating, inkjet coating, and the like, but is not limited thereto.

The drying of the liquid crystal solution may be performed at a temperature of greater than or equal to a boiling point of the solvent, for example, a temperature less than or equal to about 130° C., for example about 25° C. to about 100° C.

The curing of the liquid crystals may be performed by photo-curing and/or thermal curing process. For example UV irradiation may be used as a photo-curing process, but is not limited thereto.

The compensation film 100 is combined with a polarizer to provide an optical film. The optical film may be an antireflective film. The optical film may include a polarizer and a phase delay layer, and the phase delay layer may be the liquid crystal layer 120.

Hereinafter, an optical film according to one embodiment is described.

Figure 2:
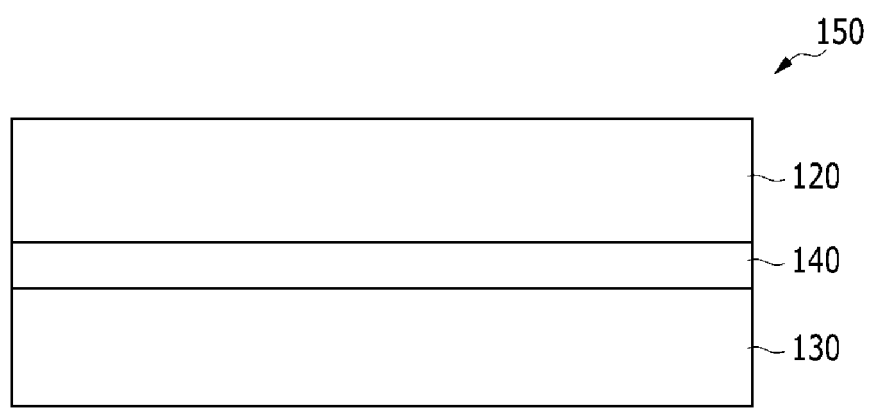
FIG. 2 is a schematic cross-sectional view showing an optical film according to one embodiment.

FIG. 2 is a schematic cross-sectional view showing an optical film according to one embodiment.

Referring to FIG. 2, an optical film 150 according to one embodiment includes a polarizer 130 and a liquid crystal layer 120.

The polarizer 130 is not particularly limited if incident unpolarized light is polarized and may include, in one example, a polyvinyl alcohol (PVA) resin including an iodine and/or a dichroic dye. The polarizer 130 may also be an elongation film.

The polarizer 130 may include, for example, a polarizing film including a polymer resin and a dichroic dye. The polymer resin may be a hydrophobic polymer resin such as, for example, a polyolefin. The polarizer 130 may be an integration-type elongation film which is made of a melt-blend of the polyolefin and the dichroic dye. The polyolefin may be elongated in a uniaxial direction, where the uniaxial direction may be the same as a length direction of the dichroic dye. The dichroic dye may be dispersed in the polyolefin, and may be aligned in the elongation direction of the polyolefin. The dichroic dye transmits one perpendicular polarization component out of two perpendicular polarization components within a predetermined wavelength region. The dichroic dye may be included in an amount of about 0.01 to about 5 parts by weight based on 100 parts by weight of the polyolefin. Within the above range, sufficient polarization characteristics may be obtained without deteriorating transmittance of the polarization film. As a further example, the dichroic dye may be included in an amount of about 0.05 to about 1 part by weight based on 100 parts by weight of the polyolefin.

The polarizer 130 may have a relatively thin thickness of less than or equal to about 100 μm, for example, less than or equal to about 50 μm, or about 10 μm to about 50 μm.

The liquid crystal layer 120 is the same as described above.

The polarizer 130 and the liquid crystal layer 120 may be bonded together with an adhesion layer 140. Alternatively, the polarizer and the liquid crystal layer may be directly bonded to one other.

The optical film 150 may be disposed on one side or both sides of a display device. In particular, the optical film 150 may be disposed on the screen side of the display device, and thus may prevent reflection of light flowing into the display device from the outside of the display device (hereinafter referred to as "reflection of external light"). Therefore, the optical film 150 may prevent deterioration in visibility due to the reflection of external light.

The optical film 150 may be effectively applied to a flexible display device such as a foldable display device or a bendable display device due to ability of the liquid crystal layer 120 to act as a phase delay layer. For example, the optical film may be a flexible film having a curvature radius of about 1 millimeter (mm) to about 10 mm.

Hereinafter, examples of a method of manufacturing an optical film are described referring to FIGS. 3 and 4.

Figure 3:
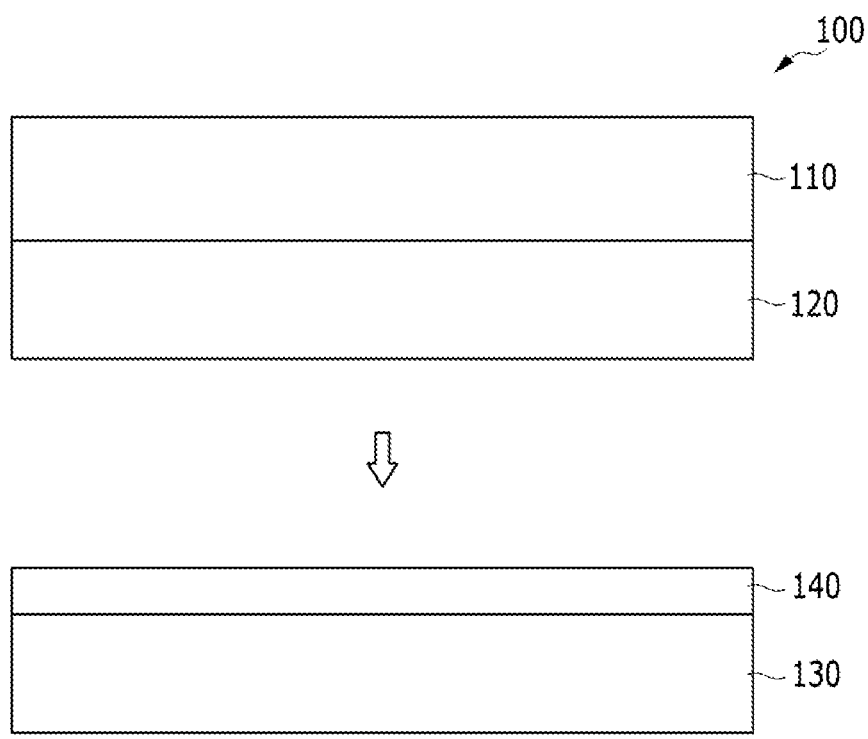
FIGS. 3 and 4 are schematic views showing a method of manufacturing an optical film according to one embodiment.
Figure 4:
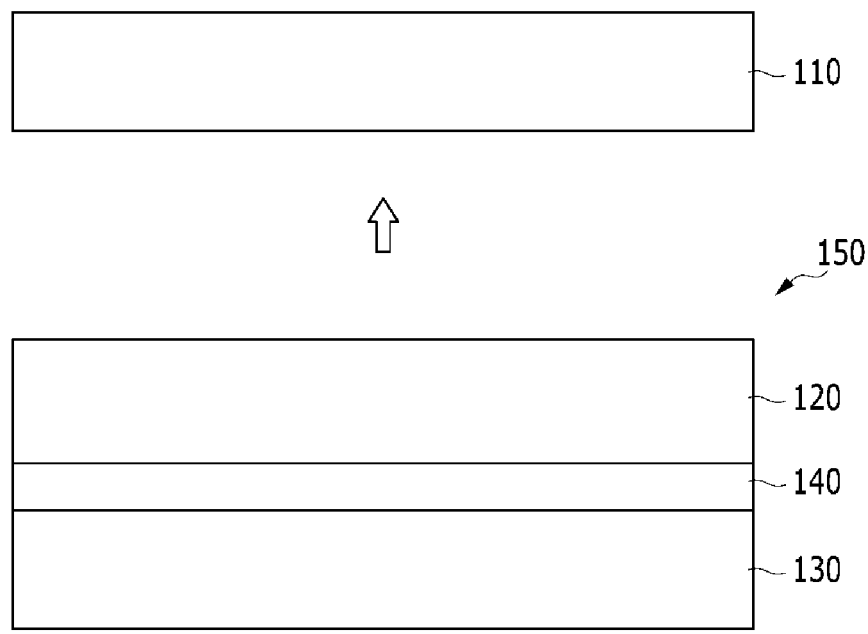

FIGS. 3 and 4 are schematic views showing a method of manufacturing an optical film according to one embodiment.

Referring to FIGS. 3 and 4, a method of manufacturing an optical film includes preparing the compensation film 100, preparing the polarizer 130, and transferring the liquid crystal layer 120 from the compensation film 100 to the polarizer 130.

The compensation film 100 may be prepared by the method described above.

The polarizer 130 may be, for example a polarizing film, and may prepared using a polymer and dichroic dye in a solid state such as a powder. The polarizer 130 may be prepared by melt-blending the polymer and dichroic dye at a temperature of greater than or equal to the melting point of the polymer and elongating the melt blend. Specifically, the polarizing film may be prepared by melt-blending a polymer and a dichroic dye, injecting the melt-blend into a mold, pressing the molded product to prepare a sheet, and elongating the sheet in a uniaxial direction.

The melt-blending may be performed by melt-blending the polymer and the dichroic dye at a temperature of, for example, less than or equal to about 300° C., and specifically, at about 130° C. to about 300° C. The step of preparing a sheet may be performed by introducing the melt-blend into the mold and pressing the same using a high pressure machine or extruding the same into a chill roll through a T-die. The elongating in a uniaxial direction may be performed by elongating the film in a uniaxial direction at a temperature of about 25° C. to about 200° C. to an elongation percentage of about 200% to about 1000%.

The transferring of the liquid crystal layer 120 may be performed by disposing the polarizer 130 to face the liquid crystal layer 120 of the compensation film 100, and transferring the liquid crystal layer 120 to the polarizer 130 from the compensation film 100. The formed elongation film 110 may be removed after the transfer. As described above, the liquid crystal layer 120 may be clearly transferred to the polarizer 130 by regulating the elongation film 110 to have a surface energy ranging from about 40 mJ/m$^2$ to about 65 mJ/m$^2$ and thus providing an appropriate peeling force between the elongation film 110 and the liquid crystal layer 120.

An adhesion layer 140 may be further disposed on one side of the polarizer 130 to bond the polarizer 130 and the liquid crystal layer 120. However, the adhesion layer 140 is optional and may be omitted.

The liquid crystal layer 120 may maintain optical properties after the transfer has occurred. For example, prior to the transfer, the liquid crystal layer 120 of the compensation film 100 may have a phase delay difference of less than or equal to about 5 nm at a wavelength of 550 nm when compared to the liquid crystal layer 120 after the transfer has taken place. Herein, the phase delay may be an in-plane phase delay and/or a thickness direction phase delay. Within the above range, the phase delay difference may be, for example, less than or equal to about 3 nm. The liquid crystal layer 120 may substantially maintain the desired optical properties before and after the transfer and thus secure reliability of the optical film 150.

The compensation film 100 or the optical film 150 may be applied to various display devices. In particular, the compensation film 100 or the optical film 150 may be effectively applied to a flexible display device such as a foldable display device or a bendable display device due to the relatively thin thickness of the compensation film.

A display device according to one embodiment includes a display panel and a compensation film or an optical film positioned on one side of the display panel. The display panel may be a liquid crystal panel or organic light emitting panel, but is not limited thereto.

Hereinafter, an organic light emitting display is described as one example of a display device.

Figure 5:
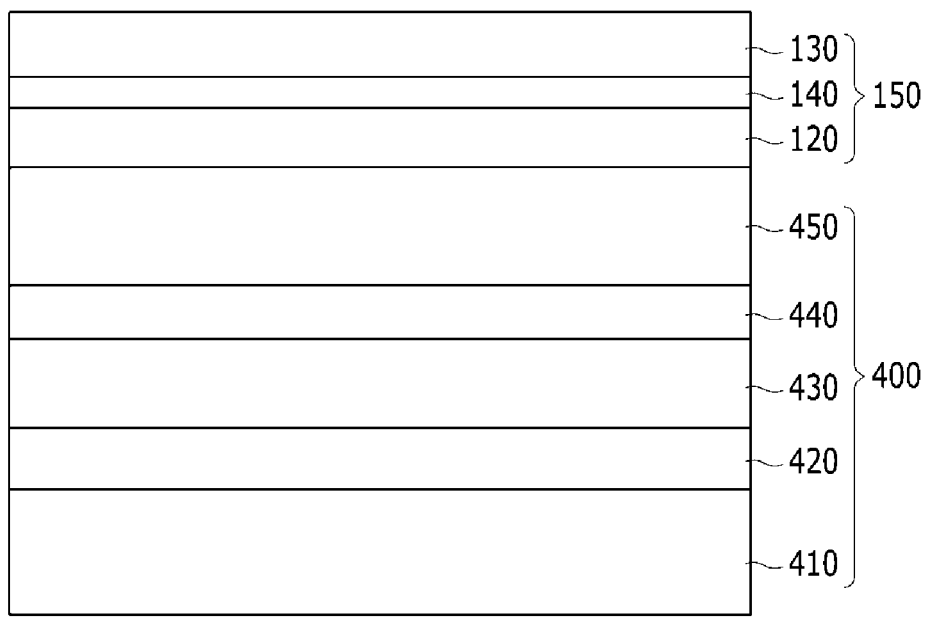
FIG. 5 is a schematic cross-sectional view showing an organic light emitting display according to one embodiment.

FIG. 5 is a cross-sectional view showing an organic light emitting display according to one embodiment.

Referring to FIG. 5, the organic light emitting display includes an organic light emitting panel 400 and either a compensation film 100 (not shown) or an optical film 150 positioned on one side of the organic light emitting panel 400. In FIG. 5, application of the optical film 150 is shown as an example, but the compensation film 100 may be applied.

The organic light emitting panel 400 may include a base substrate 410, a lower electrode 420, an organic emission layer 430, an upper electrode 440, and an encapsulation substrate 450.

The base substrate 410 may be made of glass or plastic.

At least one of the lower electrode 420 and the upper electrode 440 may be an anode, and the other one may be a cathode. The anode is an electrode injected with holes, and may be made of a transparent conductive material having a high work function to transmit the emitted light to the outside. For example, the transparent conductive material may be at least one of indium tin oxide (ITO) or indium zinc oxide (IZO). The cathode is an electrode injected with electrons, and may be made of a conductive material having a low work function and not affecting the organic material, and may be, for example, at least one of aluminum (Al), calcium (Ca), or barium (Ba).

The organic emission layer 430 includes an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer is used to balance electrons and holes, and may include a hole transport layer, a hole injection layer (HIL), an electron injection layer (EIL), and an electron transporting layer.

The encapsulation substrate 450 may be made of glass, metal, or a polymer, and may seal the lower electrode 420, the organic emission layer 430, and the upper electrode 440 to prevent moisture and/or oxygen inflow from the external environment.

The compensation film 100 or the optical film 150 may be disposed on the light-emitting side. For example, in the case of a bottom emission structure emitting light at the side of the base substrate 410, the optical film 100 may be disposed on the exterior-facing side of the base substrate 410. On the other hand, in the case of a top emission structure emitting light at the side of the encapsulation substrate 450, the optical film 100 may be disposed on the exterior-facing side of the encapsulation substrate 450.

The compensation film 100 may act as a phase delay layer as described above.

The optical film 150 may have an external light anti-reflection effect. Specifically, when the incident unpolarized light having entered from the outside is passed through the polarizer 130 and the polarized light is shifted into circularly polarized light by passing through the liquid crystal layer 120, only a first polarized perpendicular component, which is one polarized perpendicular component of two polarized perpendicular components, is transmitted. When the circularly polarized light is reflected in the organic light emitting panel 400 and changes the circular polarization direction, and the circularly polarized light is passed through the liquid crystal layer 120 again, only a second polarized perpendicular component, which is the other polarized perpendicular component of the two polarized perpendicular components, may be transmitted. Since the second polarized perpendicular component is not passed through the polarizer 130, and light does not exit outside of the organic light emitting display, effects of preventing the external light reflection may be provided. Accordingly, display characteristics of an organic light emitting display may be improved.

Hereinafter, a liquid crystal display (LCD) is described as one example of the display device.

Figure 6:
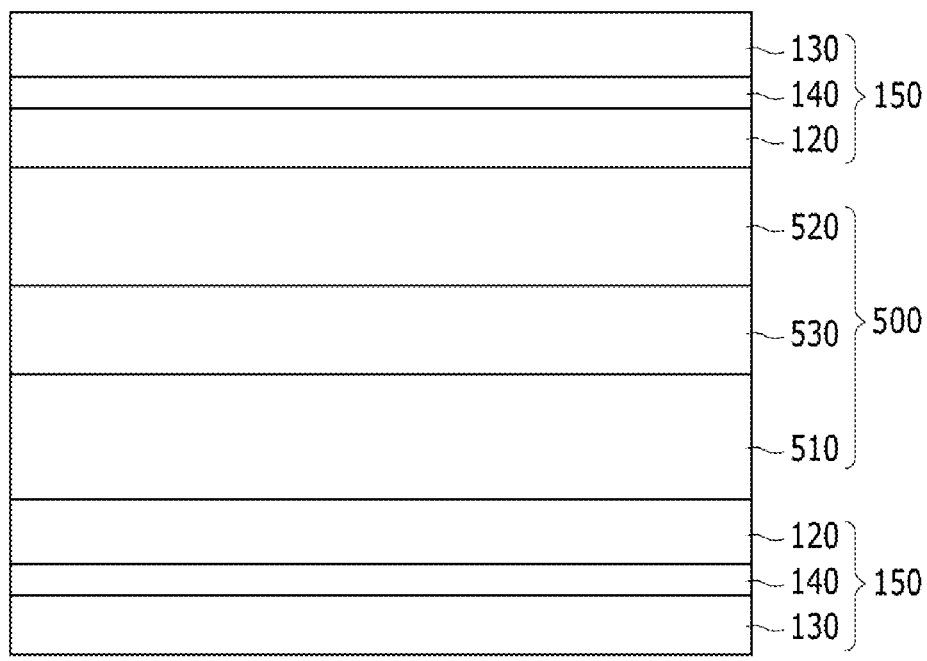
FIG. 6 is a schematic cross-sectional view of a liquid crystal display (LCD) device according to one embodiment.

FIG. 6 is a cross-sectional view schematically showing a liquid crystal display according to one embodiment.

Referring to FIG. 6, the liquid crystal display (LCD) includes a liquid crystal display panel 500, and either a compensation film 100 or an optical film 150 positioned on one side of the liquid crystal panel 500. In the drawings, application of the optical film 150 is shown as an example, but the compensation film 100 may be applied.

The liquid crystal panel 500 may be a twisted nematic (TN) display panel, a vertical alignment (PVA) display panel, an in-plane switching (IPS) display panel, an optically compensated bend (OCB) display panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same. The second display panel 520 may include, for example, a color filter (not shown) formed on a substrate (not shown) and a second electric field generating electrode (not shown). However, the liquid crystal panel 500 is not limited thereto, and the color filter may instead be included in the first display panel 510, while the first electric field generating electrode and the second electric field generating electrode may be disposed on the first display panel 510 together therewith.

The liquid crystal layer 530 may include a plurality of liquid crystal molecules. The liquid crystal molecules may have positive or negative dielectric anisotropy. In the case of the liquid crystal molecules having positive dielectric anisotropy, the major axes thereof may be aligned substantially parallel to the surface of the first display panel 510 and the second display panel 520 when not applying (i.e. in the absence of) an electric field, and the major axes may be aligned substantially perpendicular to the surface of the first display panel 510 and second display panel 520 when applying (i.e. in the presence of) an electric field. On the other hand, in the case of the liquid crystal molecules having negative dielectric anisotropy, the major axes may be aligned substantially perpendicular to the surface of the first display panel 510 and the second display panel 520 when not applying an electric field, and the major axes may be aligned substantially parallel to the surface of the first display panel 510 and the second display panel 520 when applying an electric field.

The compensation film 100 or the optical film 150 may be disposed on the outside of the liquid crystal panel 500. Although the optical film 100 is shown to be provided on both the lower part and the upper part of the liquid crystal panel 500 in FIG. 6, it is not limited thereto, and it may be formed on only one of the lower part and the upper part of the liquid crystal panel 500.

Hereinafter, the present disclosure is illustrated in more detail with reference to the examples. However, these examples are exemplary, and the present disclosure is not limited thereto.

Manufacture of Non-Elongation Film

A 100 um-thick polypropylene sheet is manufactured by adding a polypropylene-based resin (HF429, Hanwha Total Petrochemical Co., Ltd.) into a twin screw extruder (ZK35× 40D, Dr. Collin GmbH), heating and melting the resin, discharging it through a T-die, and cooling it down in a casting roll. The extruder is set at a temperature of 230° C., the casting roll is set at a cooling temperature of 40° C., and the sheet is manufactured in an open casting method without using a touch roll.

Manufacture of Compensation Film

Example 1

The 100 μm-thick polypropylene film is elongated at a rate of 660% at 110° C. by using elongation equipment (Instron). Subsequently, an elongation film having surface energy of 41.8 mJ/m$^2$ (DSA100, A. Kruss Optronic GmbH) is prepared by corona-treating (251.5 W, 9.3 rpm, NW-CDS3022DA, NOW Plasma Co. Ltd.) the surface of the polypropylene film. Then, a liquid crystal solution (RMS03-013C, Merck & Co., Inc.) is bar-coated (Meyer Bar #4) on the elongation film and dried at 55° C. to form a liquid crystal layer, thereby manufacturing a compensation film.

Example 2

The 100 μm-thick polypropylene film is elongated at 110° C. at an elongation rate of 680%. Subsequently, an elongation film having surface energy of 41.9 mJ/m$^2$ (DSA100, A. Kruss Optronic GmbH) is prepared by corona-treating the surface of the polypropylene film (312.1 W, 9.3 rpm, NW-CDS3022DA). Then, a liquid crystal solution (RMS03-013C, Merck & Co., Inc.) is bar-coated (Meyer Bar #4) on the elongation film and dried at 55° C. to form a liquid crystal layer, thereby manufacturing a compensation film.

Example 3

The 100 μm-thick polypropylene film is elongated at 110° C. and an elongation rate of 700%. Subsequently, an elongation film having surface energy of 40.2 mJ/m$^2$ (DSA100, A. Kruss Optronic GmbH) is prepared by corona-treating the surface of the polypropylene film (220.2 W, 9.3 rpm, NW-CDS3022DA). Then, a liquid crystal solution (RMS03-0130, Merck & Co., Inc.) is bar-coated on the elongation film (Meyer Bar #4) and dried at 55° C. to form a liquid crystal layer, thereby manufacturing a compensation film.

Example 4

The 100 μm-thick polypropylene film is elongated at 110° C. and an elongation rate of 700%. Subsequently, an elongation film having surface energy of 49.8 mJ/m$^2$ (DSA100, A. Kruss Optronic GmbH) is prepared by corona-treating the surface of the polypropylene film (379.8 W, 9.3 rpm, NW-CDS3022DA). Then, a liquid crystal solution (RMS03-013C, Merck & Co., Inc.) is bar-coated on the elongation film (Meyer Bar #4) and dried at 55° C. to form a liquid crystal layer, thereby manufacturing a compensation film.

Example 5

A compensation film is manufactured in the same method as Example 1 except for elongating the polypropylene film at an elongation rate of 200%.

Example 6

A compensation film is manufactured in the same method as Example 1 except for elongating the polypropylene film at an elongation rate of 250%.

Example 7

A compensation film is manufactured in the same method as Example 1 except for elongating the polypropylene film at an elongation rate of 270%.

Example 8

A compensation film is manufactured in the same method as Example 1 except for elongating the polypropylene film at an elongation rate of 500%.

Example 9

A compensation film is manufactured in the same method as Example 1 except for elongating the polypropylene film at an elongation rate of 700%.

Example 10

A compensation film is manufactured in the same method as Example 1 except for elongating the polypropylene film at an elongation rate of 1000%.

Comparative Example 1

An elongation film having surface energy of 30.9 mJ/m$^2$ (DSA100, A. Kruss Optronic GmbH) is prepared by elongating the 100 μm-thick polypropylene film at 110° C. and an elongation rate of 700% but not corona-treating the film. Subsequently, a liquid crystal solution (RMS03-013C, Merck & Co., Inc.) is bar-coated on the elongation film (Meyer Bar #4) and dried at 55° C. to form a liquid crystal layer, thereby manufacturing a compensation film.

Comparative Example 2

A compensation film is manufactured in the same method as Example 1 except for not elongating the polypropylene film.

Comparative Example 3

A compensation film is manufactured in the same method as Example 1 except for elongating the polypropylene film at an elongation rate of 120%.

Comparative Example 4

A compensation film is manufactured in the same method as Example 1 except for elongating the polypropylene film at an elongation rate of 150%.

Comparative Example 5

A compensation film is manufactured in the same method as Example 1 except for elongating the polypropylene film at an elongation rate of 180%.

Comparative Example 6

A 40 μm-thick triacetyl cellulose film having surface energy of 61.0 mJ/m$^2$ (DSA100, A. Kruss Optronic GmbH)

(Z-TAC, Fujifilm Holdings Co.) is prepared. Subsequently, a liquid crystal solution (RMS03-013C, Merck & Co., Inc.) is bar-coated on the elongation film (Meyer Bar #4) and dried at 55° C. to form a liquid crystal layer, thereby manufacturing a compensation film.

Comparative Example 7

A film having surface energy of 65.4 mJ/m² (DSA100, A. Kruss Optronic GmbH) is prepared by corona-treating (379.8 W, 9.3 rpm) a 40 μm-thick triacetyl cellulose film (Z-TAC, Fujifilm Holdings Co.). Subsequently, a liquid crystal solution (RMS03-0130, Merck & Co., Inc.) is bar-coated on the elongation film (Meyer Bar #4) and dried at 55° C. to form a liquid crystal layer, thereby manufacturing a compensation film.

Manufacture of Optical Film

Dichroic dyes represented by Chemical Formulae 1a to 1d are mixed at 1 part by weight based on 100 parts by weight of a polyolefin resin in which 60 parts by weight of polypropylene (HU300, manufactured by Samsung Total) is mixed with 40 parts by weight of a polypropylene-ethylene copolymer (RJ581, manufactured by Samsung Total). The amount of each dichroic dye is as follows: 0.200 parts by weight of a dichroic dye represented by Chemical Formula 1a (yellow, $\lambda_{max}$=385 nm, dichroic ratio=7.0), 0.228 parts by weight of a dichroic dye represented by Chemical Formula 1b (yellow, $\lambda_{max}$=455 nm, dichroic ratio=6.5), 0.286 parts by weight of a dichroic dye represented by Chemical Formula 1c (red, $\lambda_{max}$=555 nm, dichroic ratio=5.1), and 0.286 parts by weight of a dichroic dye represented by Chemical Formula 1d (blue, $\lambda_{max}$=600 nm, dichroic ratio=4.5).

of the polarizing film. Then, the polarizing film is disposed to face the liquid crystal layer of the compensation films according to Examples 1 to 11 and Comparative Examples 1 to 6. The liquid crystal layer is then transferred onto the polarizing film by removing the elongation film, thereby manufacturing an optical film.

The polarizing film has an optical axis of 0°, the liquid crystal layer has a slow axis of λ/2 plate 15° and λ/4 plate 75°, and the optical film has a thickness ranging from about 20 μm to 30 μm.

Evaluation

Evaluation 1

In the compensation films according to Examples 1 to 10 and Comparative Exampled 1 to 7, coating properties, alignment properties, and peeling properties of the liquid crystal layers are evaluated.

The coating properties are evaluated using a polarizing microscope (Nikon Co., Japan), the alignment is evaluated using Axoscan™ (Axometrics, Inc USA), and the peeling properties are evaluating by transferring the liquid crystal layer on a Z-TAC™ film (Fujifilm Holdings Co.) and comparing the liquid crystal layer remaining on the elongation film and the liquid crystal layer transferring onto the Z-TAC™ film.

The results are provided in Table 1.

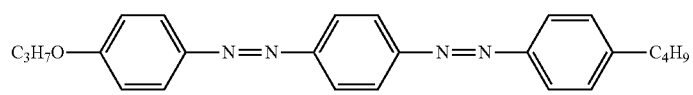

[Chemical Formula 1a]

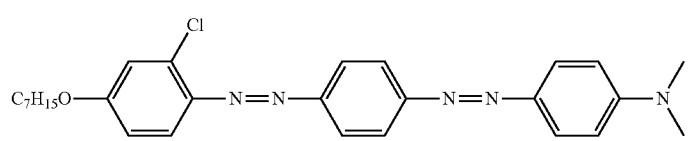

[Chemical Formula 1b]

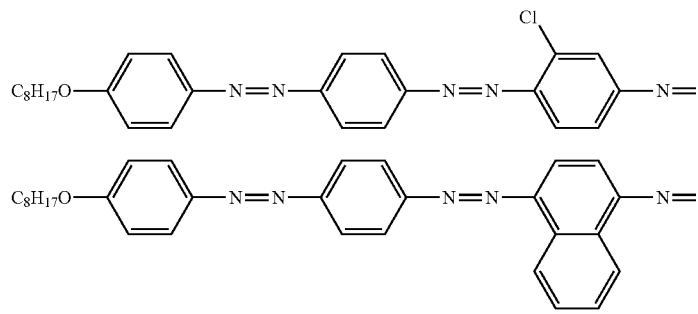

[Chemical Formula 1c]

[Chemical Formula 1d]

The mixture is melt-mixed in an extruder (Process 11 parallel twin-screw extruder, manufactured by Thermo-Fisher) at about 200° C. Subsequently, the melted mixture is cast into a film using an extruder (cast film extrusion line manufactured by Collin) to provide a sheet. Then, the sheet is elongated in a uniaxial direction 8 times (using a tension tester, manufactured by Instron) to provide a polarizing film.

Subsequently, an adhesive (PS-47, Soken Chemical & Engineering Co., Ltd.) is coated to be 7 μm thick on one side

TABLE 1

| | Liquid crystal layer | | |
| --- | --- | --- | --- |
| | Coating properties | Alignment properties | Peeling-off (transferring characteristics) |
| Example 1 | ⊚ | ⊚ | ⊚ |
| Example 2 | ⊚ | ⊚ | ⊚ |

TABLE 1-continued

|  | Liquid crystal layer | | |
|---|---|---|---|
|  | Coating properties | Alignment properties | Peeling-off (transferring characteristics) |
| Example 3 | ◉ | ◉ | ◉ |
| Example 4 | ◉ | ◉ | ◉ |
| Example 5 | ◉ | ◉ | ◉ |
| Example 6 | ◉ | ◉ | ◉ |
| Example 7 | ◉ | ◉ | ◉ |
| Example 8 | ◉ | ◉ | ◉ |
| Example 9 | ◉ | ◉ | ◉ |
| Example 10 | ◉ | ◉ | ◉ |
| Comparative Example 1 | X | X | ◉ |
| Comparative Example 2 | ◉ | X | ◉ |
| Comparative Example 3 | ◉ | X | ◉ |
| Comparative Example 4 | ◉ | X | ◉ |
| Comparative Example 5 | ◉ | X | ◉ |
| Comparative Example 6 | ◉ | X | ◉ |
| Comparative Example 7 | ◉ | X | X |

◉: Satisfactory
X: Unsatisfactory (dewetting, hazy & pin hole, unsatisfactory alignment, foreign material after peeling)

Referring to Table 1, the compensation films according to Examples 1 to 10 exhibit satisfactory coating properties, alignment properties, and peeling properties of the liquid crystal layers. On the contrary, the compensation films according to Comparative Examples 1 to 7 show at least one of unsatisfactory coating properties, alignment properties, and peeling properties of the liquid crystal layers.

Evaluation 2

In the compensation films according to Examples 1 to 10 and Comparative Exampled 1 to 7, phase delay of each compensation film, phase delay of each elongation film after transferring, and phase delay of each liquid crystal layer are respectively measured.

The phase delay is measured as an in-plane phase delay and a thickness direction phase delay by using Axoscan™ equipment (Axometrics, Inc.) at a wavelength of 550 nm (but the wavelength may be in a range of 400 nm to 700 nm). The phase delays of the elongation film and the compensation film and the liquid crystal layer after transferring are respectively adjusted by adjusting an incidence angle every 5° from −40° to 40°. A phase delay change before and after transferring is evaluated by comparing a phase delay difference between the compensation film and the elongation film with the phase delay of the liquid crystal layer.

The results are provided in Tables 2 and 3.

TABLE 2

|  | Phase delay of elongation film | | Phase delay of compensation film | | Phase delay of liquid crystal layer | |
|---|---|---|---|---|---|---|
|  | $R_{o1}$ | $R_{th1}$ | $R_o$ | $R_{th}$ | $R_{o2}$ | $R_{o2}$ |
| Example 1 | 584.8 | 295.4 | 801.4 | 400.1 | 216.6 | 104.6 |
| Example 2 | 586.6 | 296.9 | 819.3 | 398.6 | 232.7 | 101.8 |
| Example 3 | 600.5 | 267.0 | 849.1 | 382.5 | 248.6 | 115.5 |
| Example 4 | 635.7 | 280.0 | 898.0 | 384.0 | 263.2 | 106.1 |
| Example 5 | 251.2 | 124.0 | 518.2 | 232.9 | 266.7 | 107.6 |
| Example 6 | 386.0 | 169.6 | 640.5 | 280.1 | 253.4 | 108.2 |
| Example 7 | 422.4 | 175.9 | 666.7 | 281.6 | 243.2 | 103.9 |
| Example 8 | 631.7 | 256.0 | 910.3 | 376.0 | 276.2 | 121.2 |
| Example 9 | 667.2 | 296.7 | 890.4 | 402.9 | 222.4 | 105.2 |
| Example 10 | 713.3 | 330.1 | 965.7 | 444.0 | 251.2 | 111.2 |
| Comparative Example 1 | 599.82 | 269.2 | Unmeasurable | Unmeasurable | Unmeasurable | Unmeasurable |
| Comparative Example 2 | 5.7 | 13.0 | Unmeasurable | Unmeasurable | Unmeasurable | Unmeasurable |
| Comparative Example 3 | 67.3 | 37.6 | Unmeasurable | Unmeasurable | Unmeasurable | Unmeasurable |
| Comparative Example 4 | 152.0 | 79.6 | Unmeasurable | Unmeasurable | Unmeasurable | Unmeasurable |
| Comparative Example 5 | 217.4 | 103.1 | Unmeasurable | Unmeasurable | Unmeasurable | Unmeasurable |
| Comparative Example 6 | 0.8 | 6.9 | Unmeasurable | Unmeasurable | Unmeasurable | Unmeasurable |
| Comparative Example 7 | 0.6 | 7.3 | Unmeasurable | Unmeasurable | Unmeasurable | Unmeasurable |

TABLE 3

|  | Changes in phase delay before and after transferring | |
|---|---|---|
|  | $\Delta R_{o2}$ | $\Delta_{th2}$ |
| Example 1 | 1.00 | 1.08 |
| Example 2 | 0.93 | 3.09 |
| Example 3 | 1.21 | 3.87 |
| Example 4 | 0.86 | 2.11 |
| Example 5 | 0.35 | 1.25 |
| Example 6 | 1.11 | 2.30 |
| Example 7 | 1.08 | 1.78 |
| Example 8 | 2.42 | 1.22 |
| Example 9 | 0.85 | 0.98 |
| Example 10 | 1.23 | 2.66 |
| Comparative Example 1 | Unmeasurable | Unmeasurable |
| Comparative Example 2 | Unmeasurable | Unmeasurable |
| Comparative Example 3 | Unmeasurable | Unmeasurable |
| Comparative Example 4 | Unmeasurable | Unmeasurable |
| Comparative Example 5 | Unmeasurable | Unmeasurable |
| Comparative Example 6 | Unmeasurable | Unmeasurable |
| Comparative Example 7 | Unmeasurable | Unmeasurable |

Referring to Table 3, the compensation films according to Examples 1 to 10 show a small phase delay change of the liquid crystal layer before and after transferring. Specifically, the liquid crystal layer shows an in-plane phase delay change and a thickness direction phase delay change, respectively, of less than or equal to 5 nm.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A compensation film comprising an elongation film having an elongation rate of greater than or equal to 200% in a uniaxial direction and a surface energy of 40 mJ/m² to 65 mJ/m² and a liquid crystal layer disposed on the elongation film and comprising liquid crystals,
    wherein the elongation film has an in-plane phase delay of less than or equal to 750 nm at a 550 nm wavelength, and
    wherein the liquid crystal layer has an in-plane phase delay of 110 nm to 300 nm at a 550 nm wavelength.

2. The compensation film of claim 1, wherein the elongation film comprises at least one of polyolefin, polycarbonate, polyethylene terephthalate, or polyvinyl alcohol.

3. The compensation film of claim 1, wherein the elongation film has an elongation rate of 200% to 1000% in the uniaxial direction.

4. The compensation film of claim 1, wherein the liquid crystals are aligned along the uniaxial direction of the elongation film.

5. The compensation film of claim 1, wherein the elongation film and the liquid crystal layer are in direct contact with each other.

6. A method of manufacturing a compensation film, comprising preparing an elongation film having an elongation rate of greater than or equal to 200% in a uniaxial direction and a surface energy of 40 mJ/m$^2$ to 65 mJ/m$^2$, and forming a liquid crystal layer on the elongation film,
wherein the elongation film has an in-plane phase delay of less than or equal to 750 nm at a 550 nm wavelength, and
wherein the liquid crystal layer has an in-plane phase delay of 110 nm to 300 nm at a 550 nm wavelength.

7. The method of claim 6, wherein the preparing of the elongation film comprises elongating a film to an elongation rate of 200% to 1000% in a uniaxial direction.

8. The method of claim 6, wherein the preparing of the elongation film further comprises subjecting a film to at least one of a corona treatment, an ultraviolet treatment, a plasma treatment, or a halogenation treatment.

9. The method of claim 6, wherein the forming of the liquid crystal layer comprises
coating a solution comprising liquid crystals on the elongation film,
drying the coated solution, and
curing the liquid crystals.

10. A method of manufacturing an optical film, comprising preparing a compensation film by preparing an elongation film having an elongation rate of greater than or equal to 200% in a uniaxial direction and a surface energy of 40 mJ/m$^2$ to 65 mJ/m$^2$ and forming a liquid crystal layer on the elongation film, preparing a polarizer, and disposing the polarizer to face the liquid crystal layer of the compensation film, and transferring the liquid crystal layer to the polarizer from the compensation film,
wherein the elongation film has an in-plane phase delay of less than or equal to 750 nm at a 550 nm wavelength, and
wherein the liquid crystal layer has an in-plane phase delay of 110 nm to 300 nm at a 550 nm wavelength.

11. The method of claim 10, further comprising applying an adhesive on the polarizer, and
adhering the polarizer and the liquid crystal layer by interposing the adhesive.

12. The method of claim 10, wherein the preparing the elongation film comprises elongating a film to an elongation rate of 200% to 1000% in a uniaxial direction and subjecting the film to at least one of a corona treatment, an ultraviolet treatment, a plasma treatment, or a halogenation treatment.

13. The method of claim 10, wherein the forming of the liquid crystal layer comprises
coating a solution comprising liquid crystals on the elongation film,
drying the coated solution, and
curing the liquid crystals.

14. The method of claim 10, wherein a difference between in-plane phase delay at a 550 nm wavelength of the liquid crystal layer and in-plane phase delay at a 550 nm wavelength of the transferred liquid crystal layer is less than or equal to 5 nm.

15. The method of claim 10, wherein the preparing of the polarizer comprises
melt-blending a hydrophobic polymer resin and a dichroic dye, and
preparing a polarizing film in a form of a sheet using the melt-blend.

16. A display device comprising the compensation film of claim 1.

* * * * *